US012640431B2

(12) United States Patent　(10) Patent No.:　US 12,640,431 B2
Toda　(45) Date of Patent:　May 26, 2026

(54) BATTERY CASE AND MANUFACTURING METHOD OF BATTERY CASE

(71) Applicant: Kobe Steel, Ltd., Kobe (JP)

(72) Inventor: Kaname Toda, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 631 days.

(21) Appl. No.: 18/175,896

(22) Filed: Feb. 28, 2023

(65) Prior Publication Data

US 2023/0307767 A1　Sep. 28, 2023

(30) Foreign Application Priority Data

Mar. 23, 2022　(JP) ................................. 2022-047257

(51) Int. Cl.
　H01M 50/262　(2021.01)
　B23K 103/20　(2006.01)
　H01M 50/224　(2021.01)
　H01M 50/291　(2021.01)

(52) U.S. Cl.
　CPC ....... H01M 50/262 (2021.01); H01M 50/224 (2021.01); H01M 50/291 (2021.01); *B23K 2103/20* (2018.08)

(58) Field of Classification Search
　CPC ............. H01M 50/224; H01M 50/291; H01M 50/204; H01M 50/244; H01M 50/249; H01M 50/26; B23K 2103/20
　See application file for complete search history.

(56) References Cited

U.S. PATENT DOCUMENTS

| | | | | |
|---|---|---|---|---|
| 2015/0255764 A1* | 9/2015 | Loo | ......................... | B60L 50/64 |
| | | | | 429/149 |
| 2019/0157642 A1* | 5/2019 | Toyota | ................ | H01M 50/249 |
| 2020/0136213 A1* | 4/2020 | Geskes | .................. | B60L 50/64 |

FOREIGN PATENT DOCUMENTS

| | | | | |
|---|---|---|---|---|
| CN | 110544755 A | | 12/2019 | |
| CN | 110571384 A | * | 12/2019 | ............ H01M 50/20 |
| JP | 2007269123 A | * | 10/2007 | |
| JP | 2016-97851 A | | 5/2016 | |
| KR | 10-2020-0063830 A | | 6/2020 | |

OTHER PUBLICATIONS

CN110571384 (Year: 2019).*
JP2007269123 (Year: 2007).*

* cited by examiner

*Primary Examiner* — Maria Laios
(74) *Attorney, Agent, or Firm* — Oblon, McClelland, Maier & Neustadt, L.L.P.

(57)　ABSTRACT

A battery case, including a cross member between a pair of opposing wall surfaces of an inner peripheral surface of a rectangular frame body to partition an inside space surrounded by a frame body, and a bonding assistance member between each end portion of the cross member and each of the wall surfaces of the frame body facing the end portion. One end portion of the bonding assistance member is welded to the wall surface, and the bonding assistance member has an overlap portion extending from the one end portion toward the inside space and overlapping with a side surface of the end portion of the cross member.

12 Claims, 10 Drawing Sheets

F I G. 1

F I G. 2
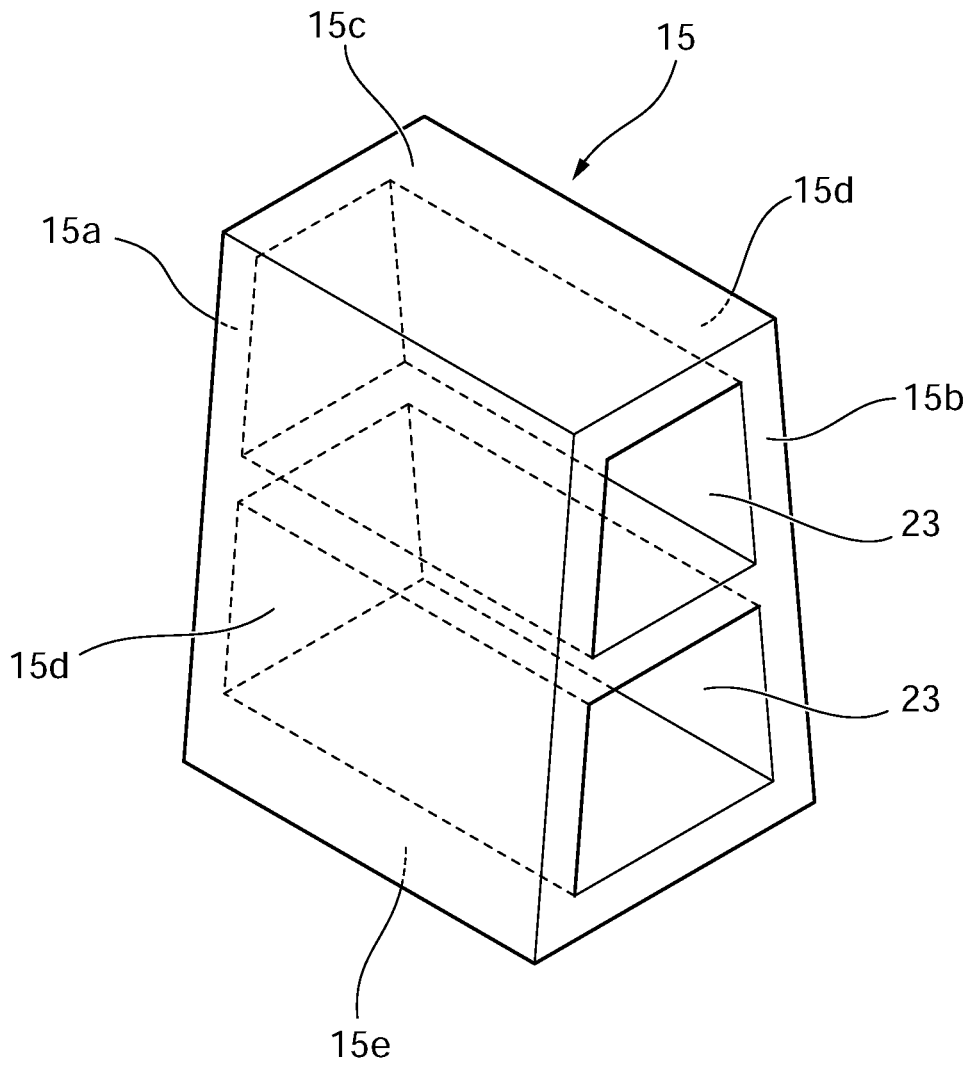

FIG. 3

F I G. 5
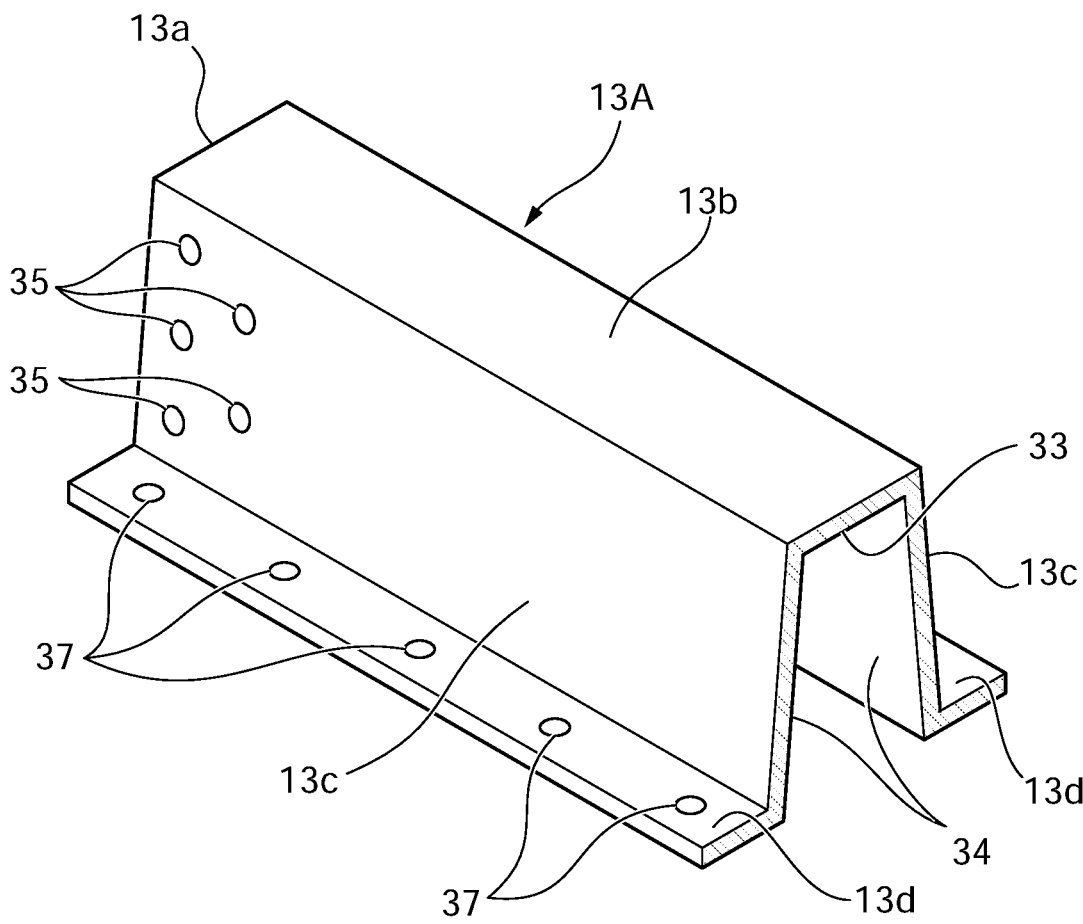

F I G. 6
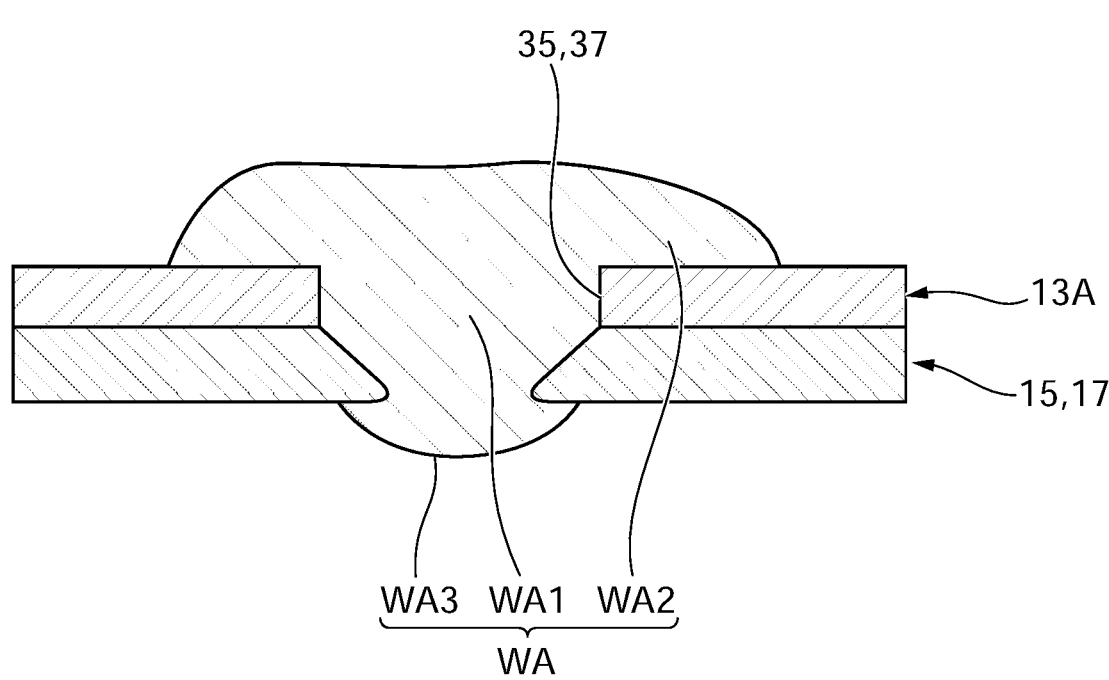

F I G. 7
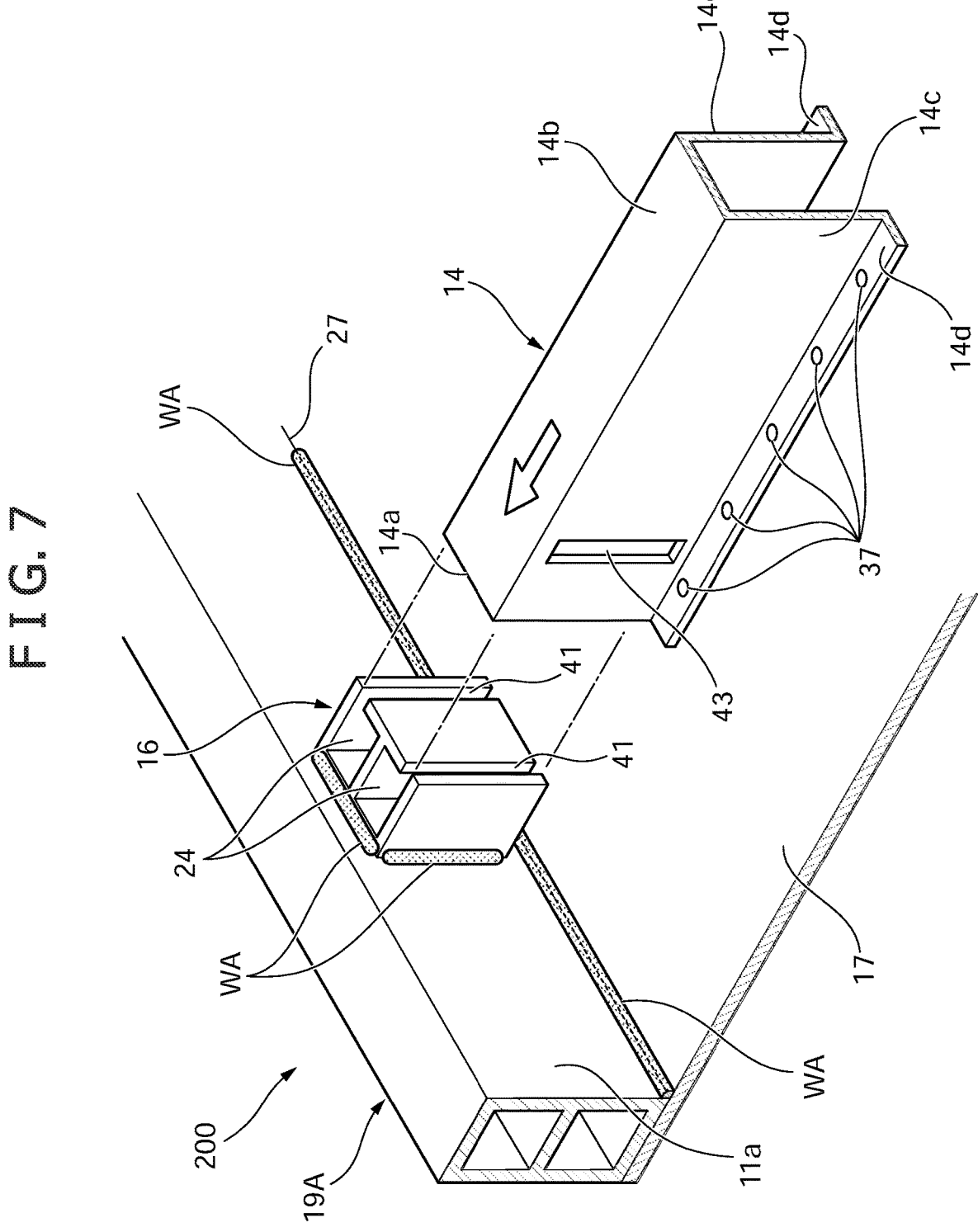

F I G. 8
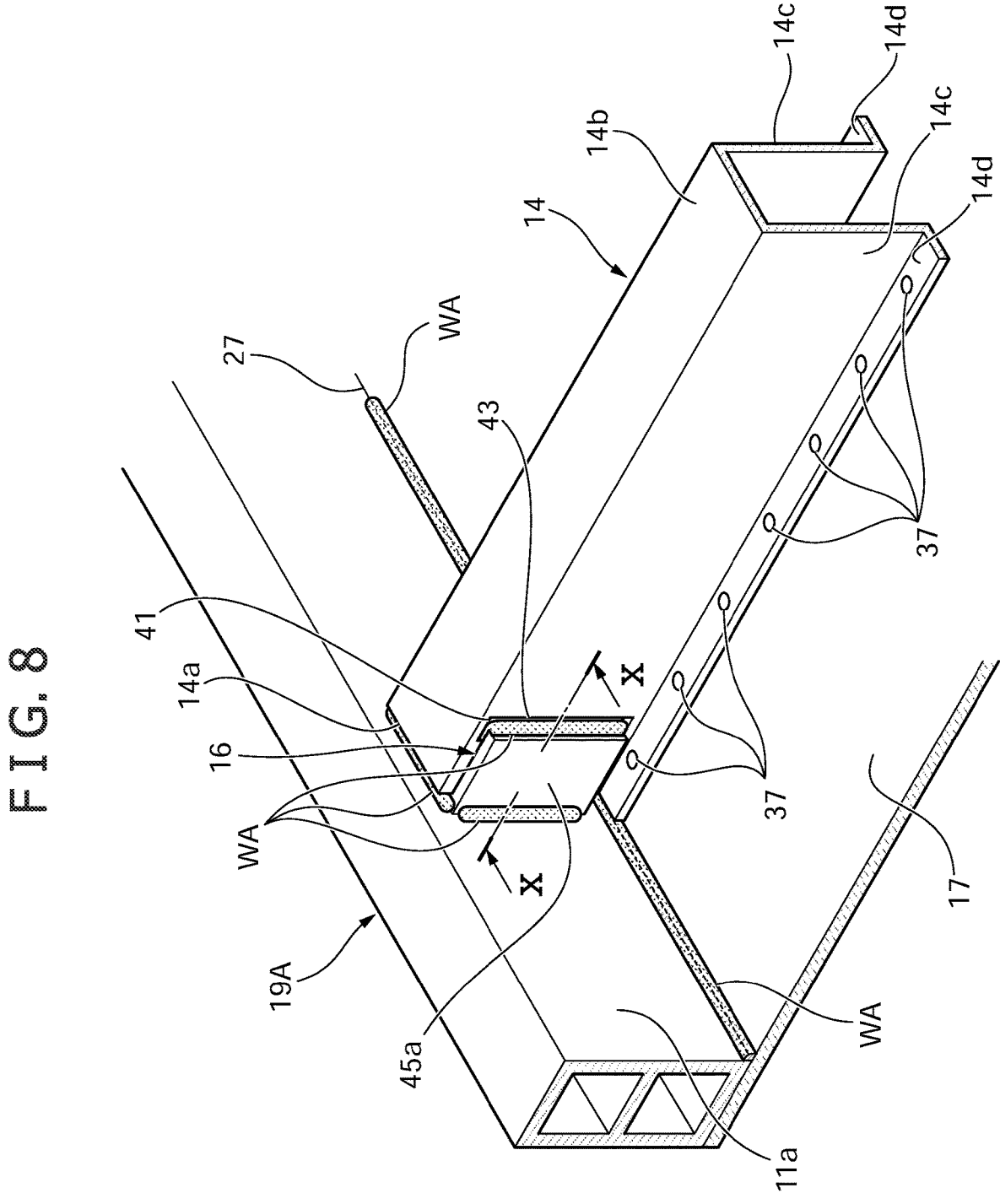

F I G. 11
--Prior Art--
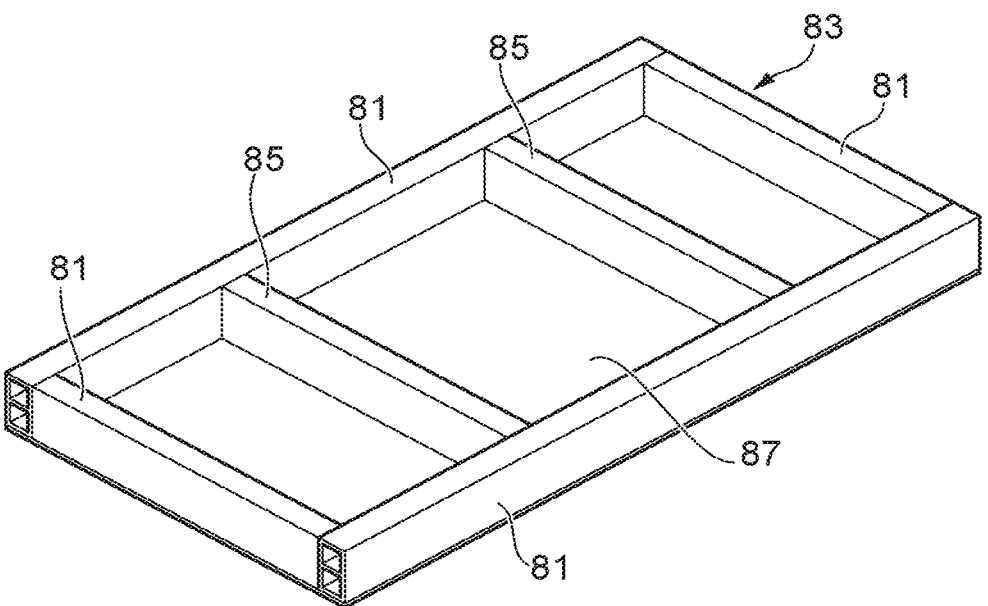

BATTERY CASE AND MANUFACTURING METHOD OF BATTERY CASE

CROSS REFERENCE TO RELATED APPLICATIONS

This application is claims priority to Japanese Patent Application No. 2022-047257, filed on Mar. 23, 2022. The entire contents of which are incorporated herein by reference.

BACKGROUND OF THE INVENTION

Field of the Invention

The present invention relates to a battery case and a manufacturing method of a battery case.

Description of the Related Art

In recent years, development of vehicles whose drive sources are electric power such as electric vehicles and hybrid vehicles have been actively promoted. In a battery system mounted in such a vehicle, a mode in which a number of batteries are housed in a battery case configured by a predetermined frame, etc. is generally adopted.

The battery case requires such strength that the housed batteries can be protected from an impact due to collision, etc., and also demands a reduction in material cost and manufacturing cost. Moreover, from a viewpoint of improvement in fuel consumption in relation to global environmental problems due to emissions, etc., a reduction in weight of the battery case is also demanded.

For example, a general battery case shown in FIG. 11 includes a rectangular frame body 83 configured by four frame members 81, a plurality of cross members 85 whose both ends are bonded to the frame body 83 for reinforcement, and a floor plate member 87 configuring a floor surface of the frame body 83. As the frame members 81 and the cross members 85, an extruded article of an aluminum material is heavily used since the extruded article has light weight and high rigidity.

A structure of such a battery case is disclosed in JP 2007-269123 A as a vehicle body frame for an automobile, for example. JP 2007-269123 A describes that by fastening a side frame made of an aluminum material, the side frame having a closed section structure and a cross member made of an aluminum material, the cross member having a closed section structure via a fastening member, strength to combine the side frame and the cross member is prevented from lowering. This fastening member has a flat plate-shaped base portion, and a pair of support portions extending in the perpendicular direction with respect to the base portion, and is formed by an aluminum extruded material formed in a Π shape in a plan view. The base portion is fastened to a side surface of the side frame by bolts, the pair of support portions nip an end portion of the cross member, and the cross member and the support portions are welded at weld portions.

In a case where all the frame members 81 and the cross members 85 described above are made of an aluminum material, weight can be reduced but the material cost is increased in comparison to a case where the members are configured by a steel material. Meanwhile, in a case where all the frame members 81 and the cross members 85 are made of a steel material, the cost can be lowered but weight is increased. Thus, it can be thought that the members are configured by combining an aluminum material and a steel material. In that case, however, welding of aluminum materials to each other, welding of an aluminum material and a steel material, and welding of steel materials to each other are required. An AC welding device using an aluminum arc welding rod or an aluminum welding wire is used for the welding of the aluminum materials to each other and the welding of the aluminum material and the steel material, and a spot welding device or a DC welding device using a steel welding wire is used for the welding of the steel materials to each other. Thus, in a manufacturing step, at least two welding machines are required. Moreover, from a viewpoint of safety, a space for an arrangement to separate welding places of the respective welding machines is also required. Thus, an increase in equipment cost and a loss of takt time are caused.

Further, for bonding different materials of the frame members 81 of an aluminum material and the cross members 85 of a steel material, for example, it is assumed to use MIG arc spot welding of different types of metals to each other, etc. However, the direction of a load applied to a bonded portion by this welding becomes the direction in which the members break away from each other. The bonded portion by the spot welding described above has the characteristic of being strong for a load in the shearing direction but weak for a load in the break-away direction. Thus, there is a problem that a structure in which the load in the break-away direction is applied to the bonded portion is disadvantageous in terms of strength.

SUMMARY OF THE INVENTION

Therefore, the present invention is achieved in consideration of the above problems, and an object thereof is to provide a battery case and a manufacturing method of a battery case that can be produced with light weight at low cost and with which high bonding strength can be furthermore obtained even with a multi-material structure where an aluminum material and a steel material are combined.

The present invention includes the following configurations.

(1) A battery case in which at least one cross member is provided between a pair of opposing wall surfaces of an inner peripheral surface of a rectangular frame body to partition an inside space surrounded by the frame body,
wherein a bonding assistance member is provided between each of end portions of the cross member and each of the wall surfaces of the frame body facing the end portion,
the frame body and the bonding assistance member are made of aluminum or an aluminum alloy,
the cross member is made of steel,
one end portion of the bonding assistance member is welded to the wall surface, and the bonding assistance member has an overlap portion extending from the one end portion toward the inside space and overlapping with a side surface of the end portion of the cross member,
in the cross member, first through holes passing through to look out on the overlap portion of the bonding assistance member are formed, and
the bonding assistance member and the cross member are bonded with a weld metal of aluminum or an aluminum alloy formed by welding at positions of the first through holes.

(2) A manufacturing method of a battery case, in which at least one cross member is provided between a pair of opposing wall surfaces of an inner peripheral surface of a rectangular frame body to partition an inside space surrounded by the frame body, a bonding assistance member is provided between each of end portions of the cross member and each of the wall surfaces of the frame body facing the end portion, the frame body and the bonding assistance member are made of aluminum or an aluminum alloy, and the cross member is made of steel, the manufacturing method including:

a step of welding one end portion of the bonding assistance member to the wall surface of the frame body; and a step of, in an overlap portion extending from the one end portion of the bonding assistance member toward the inside space and overlapping with a side surface of the end portion of the cross member, welding at positions of first through holes formed in the cross member, the first through holes passing through to look out on the overlap portion, and bonding the bonding assistance member and the cross member with a weld metal of aluminum or an aluminum alloy formed at the positions of the first through holes.

According to the present invention, it is possible to provide the battery case and the manufacturing method of the battery case that can be produced with light weight at low cost and with which high bonding strength can be furthermore obtained even with a multi-material structure where an aluminum material and a steel material are combined.

BRIEF DESCRIPTION OF THE DRAWINGS

FIG. 1 is a perspective view of a battery case of a first embodiment.

FIG. 2 is a perspective view of a bonding assistance member.

FIG. 3 is a view in which a P1 portion of the battery case shown in FIG. 1 is enlarged, the partly-enlarged view showing a state before a cross member is bonded.

FIG. 5 is a partly-enlarged perspective view of the cross member.

FIG. 6 is a schematically sectional view of a bonding point of the cross member, and the bonding assistance member or a floor plate member.

FIG. 7 is a perspective view showing a situation where a first frame member and a cross member of a battery case of a second embodiment are bonded via a bonding assistance member.

FIG. 8 is a perspective view showing a state where the cross member and the bonding assistance member shown in FIG. 7 are bonded.

FIG. 11 is a perspective view of a conventional battery case.

DESCRIPTION OF THE PREFERRED EMBODIMENTS

Figure 4:
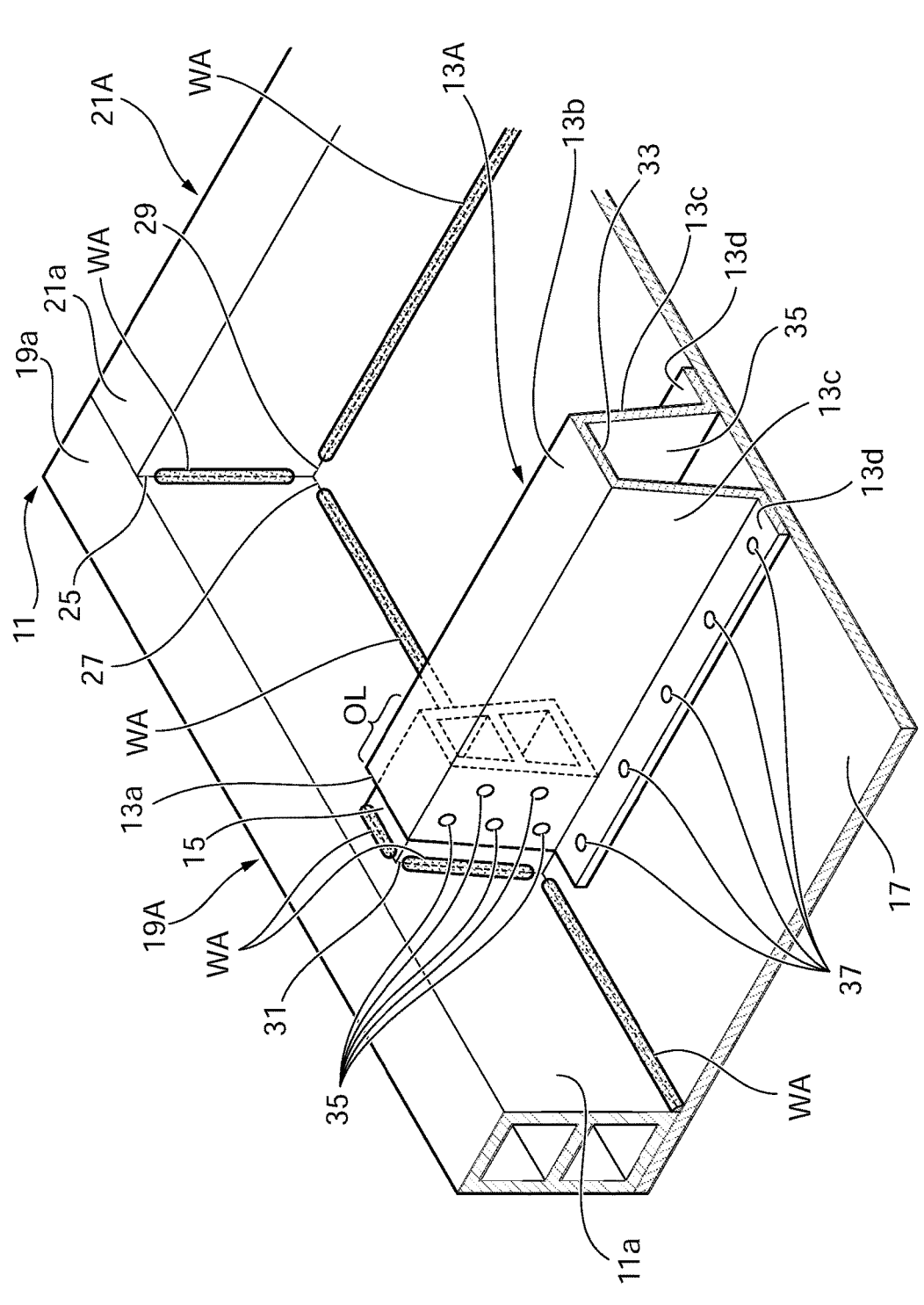
FIG. 4 is a view in which the P1 portion of the battery case shown in FIG. 1 is enlarged, the partly-enlarged view showing a state after the cross member is bonded.

Hereinafter, embodiments of the present invention will be described in detail with reference to the drawings.

First Embodiment (Configuration of Battery Case)

Figure 1:
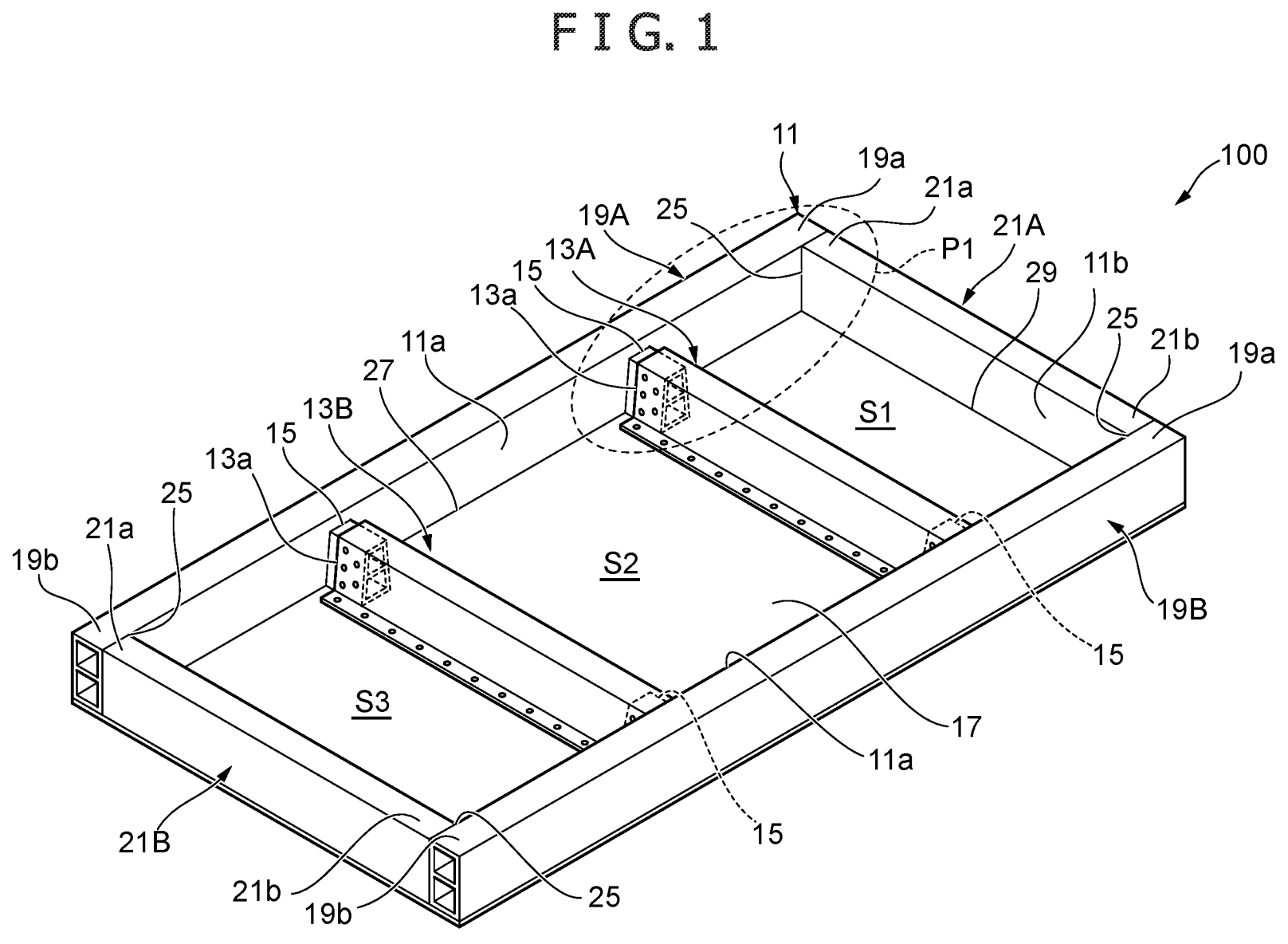

FIG. 1 is a perspective view of a battery case 100 of a first embodiment.

The battery case 100 includes a rectangular frame body 11, at least one but two (as an example in the present configuration) cross members 13A, 13B arranged inside the frame body 11, bonding assistance members 15 that connect the cross members 13 and the frame body 11, and a floor plate member 17.

The frame body 11 is configured by a pair of first frame members 19A, 19B opposing each other, and a pair of second frame members 21A, 21B opposing each other. One end portions 21a of the pair of second frame members 21A, 21B are respectively bonded to one end portion 19a and the other end portion 19b of the first frame member 19A. The other end portions 21b of the pair of second frame members 21A, 21B are respectively bonded to one end portion 19a and the other end portion 19b of the first frame member 19B.

The cross members 13A, 13B are arranged between a pair of opposing wall surfaces 11a of an inner peripheral surface of the frame body 11 to partition an inside space surrounded by the rectangular frame body 11. The cross members 13A, 13B are rod-shaped members extending in the one-axis direction and are formed to be slightly shorter than the second frame members 21A, 21B.

The bonding assistance members 15 are respectively arranged between end portions 13a (at four points in total in the present configuration) of the cross members 13A, 13B and the wall surfaces 11a of the frame body 11, and integrally bond the cross members 13A, 13B and the frame body 11.

The floor plate member 17 is bonded to a lower surface of the frame body 11 and configures a bottom surface inside the frame body 11.

In the battery case 100 of the above configuration, a plurality of regions (three regions S1, S2, S3 in the present configuration) are partitioned by the first frame members 19A, 19B, the second frame members 21A, 21B, and the cross members 13A, 13B. The regions S1, S2, S3 are served, for example, for housing battery packs (not shown).

All the first frame members 19A, 19B and the second frame members 21A, 21B configuring the frame body 11, and the floor plate member 17 are made of aluminum or an aluminum alloy (hereinafter, also referred to as an aluminum material). Further, specifically, the first frame members 19A, 19B and the second frame members 21A, 21B are formed by a hollow extruded material of an aluminum material whose thickness is approximately 2 to 5 mm, and the material is preferably JIS or AA 5000 series, 6000 series, 7000 series, etc. of aluminum alloys from the standpoint that the alloys are excellent in strength and capable of thinning. The hollow extruded material of the aluminum material is manufactured by a normal manufacturing step for extruded materials in which casting such as a DC casting method or a continuous casting method, homogenization heat treatment, hot extrusion, solution and quenching treatment, and thermal refining treatment such as artificial aging treatment to be implemented according to need are appropriately combined. By using the extruded material, the frame members have high strength, and rigidity of the battery case 100 can be easily enhanced.

The cross members 13A, 13B are made of steel, and formed by a steel plate of common carbon steel or high-strength steel, etc. Specifically, a steel plate may be bent so that a vertical section in the longitudinal direction is formed into a hat shape or a "Ω" shape, or a circular steel pipe may be crushed so that a sectional shape becomes an oval shape or an oblong shape. Further, a sectional shape may be a shape in which a rib plate is added by welding in the "Π" shape, or bending may be performed to provide a "S" shape, a "B" shape, etc., and mating parts of steel materials may be welded to each other. Then, for purpose of corrosion resistance, a variety of plating of zinc, etc., or surface treatment such as electrodeposition coating may be implemented on surfaces of the cross members 13A, 13B.

FIG. 2 is a perspective view of the bonding assistance member 15.

The bonding assistance member 15 is a member made of an aluminum material, the member being arranged along the longitudinal direction of the cross members 13A, 13B shown in FIG. 1. The bonding assistance member 15 is preferably a hollow extruded material of an aluminum material whose thickness is approximately 2 to 5 mm but may be a plate material. Moreover, the material is preferably JIS or AA 5000 series, 6000 series, 7000 series, etc. of aluminum alloys from the standpoint that the alloys are excellent in strength and capable of thinning. In a case where the bonding assistance member 15 is the hollow extruded material, the bonding assistance member 15 is manufactured by a normal manufacturing step for extruded materials in which casting such as a DC casting method or a continuous casting method, homogenization heat treatment, hot extrusion, solution and quenching treatment, and thermal refining treatment such as artificial aging treatment to be implemented according to need are appropriately combined as well as the frame body 11.

The bonding assistance member 15 exemplified in FIG. 2 is an extruded material whose section orthogonal to the longitudinal direction has a trapezoidal outer shape. The bonding assistance member 15 has one end surface 15a and the other end surface 15b, an upper surface 15c, a pair of side surfaces 15d connected to the upper surface 15c, and a bottom surface 15e, and two hollow portions 23 are formed along the longitudinal direction.

As in the above configuration, in the battery case 100, among the constituent members, the frame body 11, the bonding assistance members 15, and the floor plate member 17 are made of an aluminum material, and only the cross members 13A, 13B are made of steel. Thereby, a reduction in weight and a lowering of cost are both achieved.

(Manufacturing Method of Battery Case)

Next, a manufacturing method of the battery case 100 of the present configuration will be described.

In order to form the frame body 11, the first frame member 19A and the second frame member 21A shown in FIG. 1 are prepared, and an end surface of the one end portion 21a of the second frame member 21A and the wall surface (side surface) 11a of the end portion 19a of the first frame member 19A are abutted with each other. In this state, a corner portion 25 formed by an edge portion of the end surface of the second frame member 21A and the wall surface 11a of the first frame member 19A is line-welded by arc welding.

Similarly, in a state where an end surface of the other end portion 21b of the second frame member 21A and the wall surface of the end portion 19a of the first frame member 19B are also abutted with each other, a corner portion 25 formed between the end surface and the wall surface is line-welded by arc welding. Moreover, regarding the other end portions 19b of the first frame members 19A, 19B, similarly, corner portions 25 formed by abutting with the second frame member 21B are line-welded by arc welding. Thereby, the rectangular frame body 11 is formed. It should be noted that the order of welding described above is arbitrary.

Welding of the first frame members 19A, 19B and the second frame members 21A, 21B is performed for example by MIG welding using an aluminum material as a consumable electrode (welding wire) (hereinafter, referred to as the "aluminum MIG welding").

The floor plate member 17 is bonded to the frame body 11 bonded in such a way. Upon bonding the floor plate member 17, first, the frame body 11 is mounted on the floor plate member 17, and corner portions 27 formed by lower surfaces of the first frame members 19A, 19B and an upper surface of the floor plate member 17 and corner portions 29 formed by lower surfaces of the second frame members 21A, 21B and the upper surface of the floor plate member 17 are line-welded by the aluminum MIG welding as well as the above description. It should be noted that the welding order is not limited to the above description. For example, after the first frame members 19A, 19B and the floor plate member 17 are welded and the second frame members 21A, 21B and the floor plate member 17 are welded, the first frame members 19A, 19B and the second frame members 21A, 21B may be welded.

Figure 3:
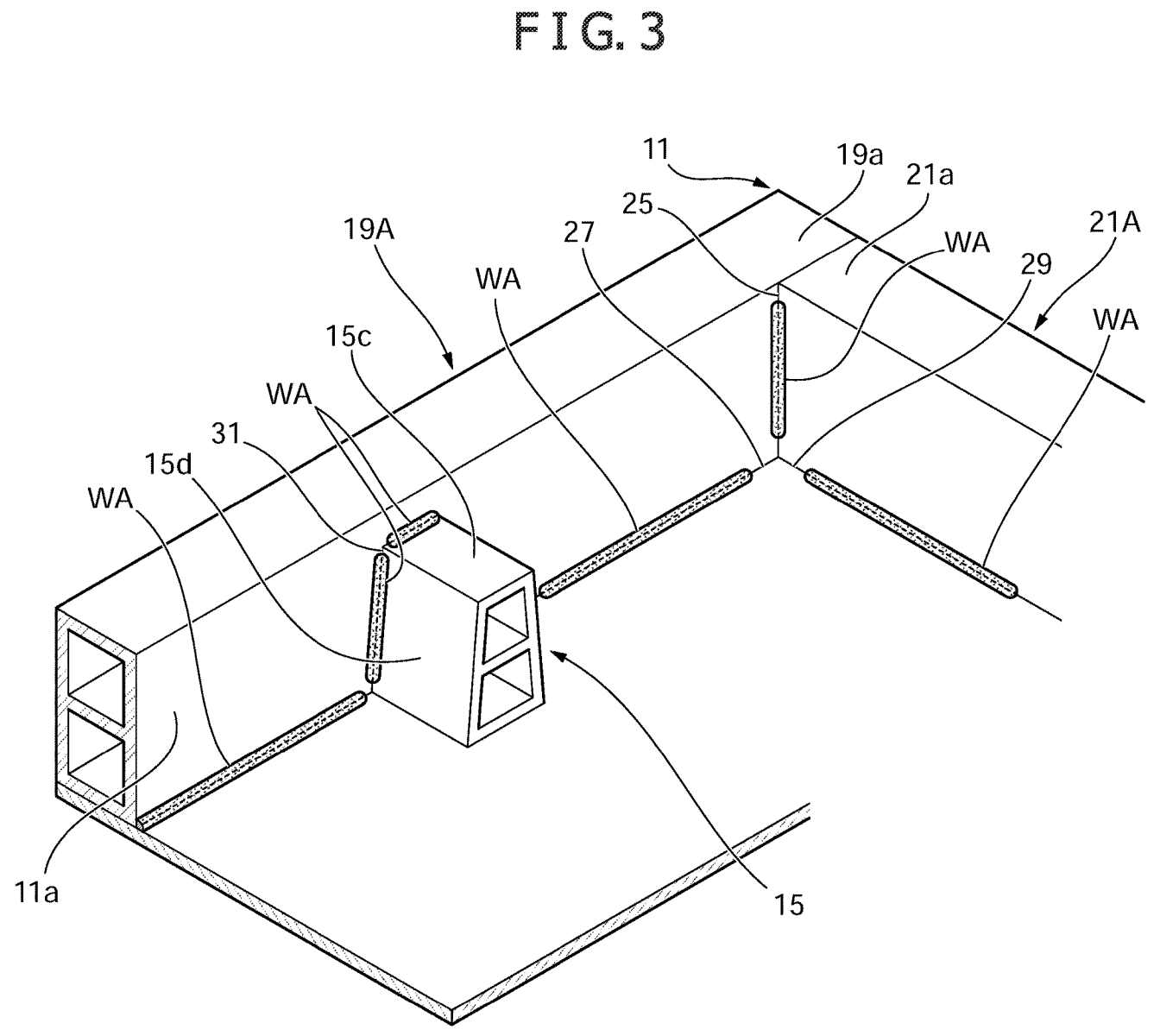

FIGS. 3 and 4 are partly-enlarged sectional views in which a P1 portion of the battery case 100 shown in FIG. 1 is enlarged. FIG. 3 shows a state before the cross member 13A is bonded, and FIG. 4 shows a state after the cross member 13A is bonded. Herein, a description will be given to a bonding part of the end portion 19a of the first frame member 19A and the end portion 21a of the second frame member 21A, and a part where the one end portion 13a of the cross member 13A and the wall surface 11a of the first frame member 19A are bonded via the bonding assistance member 15. However, since the same applies to the other corresponding bonding parts, a description for the parts is omitted.

As shown in FIG. 3, in the corner portions 25 between the first frame members 19A, 19B and the second frame members 21A, 21B, and the corner portions 27, 29 between the first frame members 19A, 19B and the second frame members 21A, 21B, and the floor plate member 17 described above, weld metals WA of an aluminum material (hereinafter, also referred to as the "aluminum weld metals") are formed along the respective corner portions 25, 27, 29 by the aluminum MIG welding. It should be noted that although the floor plate member 17 has such size that the entire lower surface of the frame body 11 is covered, the present invention is not limited to this but the floor plate member 17 may have such size that an inside wall surface of the frame body 11 is an outer edge.

Next, bonding of the frame body 11 and the cross members 13A, 13B using the bonding assistance members 15 will be described in detail.

First, the bonding assistance member 15 is bonded to the first frame member 19A before bonding to the cross member 13A. That is, the one end surface 15a of the bonding assistance member 15 is pressed onto the wall surface 11a of the first frame member 19A, and a corner portion 31 between the wall surface 11a and the bonding assistance member 15 is welded by the aluminum MIG welding. Thereby, the aluminum weld metals WA are formed along the upper surface 15*c* and the pair of side surfaces 15*d* on the one end surface 15*a* of the bonding assistance member 15.

Next, as shown in FIG. 4, the cross member 13A is mounted to cover the side surfaces 15*d* of the bonding assistance member 15, the bonding assistance member 15 and the cross member 13A are bonded, and the cross member 13A and the floor plate member 17 are bonded. The upper surface 15*c* of the bonding assistance member 15 and the cross member 13A are preferably isolated from each other since size precision in the height direction regarding the cross member 13A is not required to be high.

FIG. 5 is a partly-enlarged perspective view of the cross member 13A. The cross member 13A shown in the figure whose section orthogonal to the longitudinal direction is formed into a hat shape includes a top portion 13*b*, a pair of side wall portions 13*c*, and a pair of flange portions 13*d*. An inside ceiling surface 33 of the top portion 13*b* faces the upper surface 15*c* of the bonding assistance member 15 shown in FIG. 2. Inside surfaces 34 of the pair of side wall portions 13*c* are flat opposing surfaces respectively overlapping with and opposing the pair of side surfaces 15*d* of the bonding assistance member 15. Moreover, the pair of flange portions 13*d* are connected to the base end side (lower side) of the hat shape, and respectively extend along the floor plate member 17.

A plurality of through holes (first through holes) 35 are formed to spread over the opposing surfaces opposing the side surfaces 15*d* of the bonding assistance member 15 among the side wall portions 13*c* of the cross member 13A. Each of the through holes 35 is a hole formed in a substantially circular shape in a plan view passing through to look out on the side surface 15*d*. That is, the bonding assistance member 15 has an overlap portion OL extending from the one end portion welded to the wall surface 11*a* of the first frame member 19A toward the inside space of the frame body 11 and overlapping with side surfaces of the end portions 13*a* of the cross member 13A, and the plurality of through holes 35 are formed to pass through the cross member 13A to look out on this overlap portion OL. Moreover, a plurality of through holes (second through holes) 37 are formed on the flange portion 13*d* of the cross member 13A along the longitudinal direction, passing through to look out on the floor plate member 17. The plurality of through holes 35, 37 are preferably arranged at equal intervals to each other since an applied load can be spread uniformly. However, the through holes 35, 37 may be formed at non-equal intervals.

The cross member 13A of the above configuration is put on the bonding assistance member 15 from the upper side as shown in FIG. 4, and spot welding by the aluminum MIG welding is performed respectively at positions of the plurality of through holes 35 formed in the side wall portion 13*c* and at positions of the plurality of through holes 37 formed in the flange portion 13*d*.

This spot welding is performed at such a low current that the cross member 13A made of steel is not melted down, and thereby, penetration of the aluminum weld metals WA to fill the through holes 35, 37 is obtained. A method of spot-welding a steel material and an aluminum material in such a way is called the "different-material MIG spot welding". It should be noted that a known inert gas of argon, helium, etc. can be used as a shielding gas G.

At the positions of the through holes 35 after the spot welding, the aluminum weld metal WA containing penetration of the bonding assistance member 15 is obtained, and at the positions of the through holes 37, the aluminum weld metal WA containing penetration of the floor plate member 17 is obtained. In such a way, by filling the through holes 35, 37 with the aluminum weld metals WA and hence providing retainment from the through holes 35, 37, it is possible to bring different types of materials into a mode of being bonded to each other.

FIG. 6 is a schematically sectional view of a bonding point of the cross member 13A, and the bonding assistance member 15 or the floor plate member 17. After the cross member 13A which is a steel material, and the bonding assistance member 15 or the floor plate member 17 are spot-welded, the through holes 35, 37 are filled with the aluminum weld metals WA. Then, the aluminum weld metal WA is formed in a rivet shape having a shaft portion WA1, a head portion WA2, and a rim portion WA3. That is, the shaft portion WA1 is formed to extend in the thickness direction of the cross member 13A and reach the bonding assistance member 15 or the floor plate member 17, the head portion WA2 is formed to project to an outer portion of the cross member 13A among the shaft portion WA1 and expand from the through hole 35, 37 toward the outer peripheral side, and the rim portion WA3 is formed to project to an inner portion of the bonding assistance member 15 or the floor plate member 17 among the shaft portion WA1 and expand to the outer peripheral side. The head portion WA2 and the rim portion WA3 nip and respectively fix the cross member 13A, and the bonding assistance member 15 or the floor plate member 17.

In such a way, the cross member 13A and the bonding assistance member 15, and the cross member 13A and the floor plate member 17 are bonded at the positions of the plurality of through holes 35, 37 by the different-material MIG spot welding. The number, arrangement, etc. of the through holes 35, 37 shown herein are not particularly limited.

With the present configuration, since the aluminum weld metal WA by line welding and the aluminum weld metal WA by the spot welding can be formed by the same type of welding method, the manufacturing step does not become complicated, and it is possible to arrange welding equipment, etc. while saving space. Therefore, it is possible to suppress an increase in equipment cost and a loss of takt time, and production can be made efficiently.

Moreover, the different-material MIG spot welding for fixing the cross member 13A is implemented on the side surfaces 15*d* of the bonding assistance member 15. Thus, a load applied to the welded portion by an external force acts in the shearing direction. Therefore, in comparison to a case where a load is applied in the break-away direction with the conventional method, it is possible to improve bonding strength.

Further, since the bonding assistance member 15 is an aluminum material, material cost is increased in comparison to a case where the bonding assistance member 15 is made of steel but when using an extruded material in the bonding assistance member 15, cutting of the extruded material by desired length is only required for processing. Therefore, manufacturing becomes easy, and the cost is rather lowered in a case of comparison in terms of the sum of the material cost and manufacturing cost.

Moreover, the cross member 13A bonded to the bonding assistance member 15 is not directly bonded to the first frame members 19A, 19B but bonded to the side surfaces 15*d* of the bonding assistance member 15. Thus, high size precision is not required regarding the longitudinal direction.

In the bonding assistance member 15 described above, the section orthogonal to the longitudinal direction has a trapezoidal outer shape. However, the sectional shape is not limited to this. Moreover, when the bonding assistance member 15 is configured by the same extruded material as the first frame members 19A, 19B or the second frame members 21A, 21B, it is possible to further reduce the manufacturing cost.

Second Embodiment

Next, a second embodiment of a battery case will be described.

FIG. 7 is a perspective view showing a situation where a first frame member 19A and a cross member 14 of a battery case 200 of the second embodiment are bonded via a bonding assistance member 16. FIG. 8 is a perspective view showing a state where the cross member 14 and the bonding assistance member 16 shown in FIG. 7 are bonded. The battery case 200 of the second embodiment has the same configuration as the battery case 100 of the first embodiment except that the configuration of the cross member 14 and the bonding assistance member 16 is different.

As shown in FIGS. 7 and 8, the bonding assistance member 16 is an extruded material made of an aluminum material, in which the direction orthogonal to the respective longitudinal directions of the first frame member 19A and the cross member 14 (up and down direction) is the extruding direction. Moreover, two hollow portions 24 are formed along the extruding direction in the bonding assistance member 16. One end of the bonding assistance member 16 is welded to a wall surface 11a of the first frame member 19A by an aluminum MIG welding device. In the other end on the opposite side of the one end bonded to the first frame member 19A, a pair of gaps 41 are formed. An end portion 14a of the cross member 14 is inserted into the pair of gaps 41.

The cross member 14 whose section orthogonal to the longitudinal direction is formed into a hat shape includes a top portion 14b, a pair of side wall portions 14c, and a pair of flange portions 14d. The pair of side wall portions 14c are respectively inserted into the gaps 41 formed in the bonding assistance member 16. Moreover, the pair of flange portions 14d are connected to the base end side (lower side) of the hat shape, and respectively extend along a floor plate member 17. A slit hole (first through hole) 43 is formed in each of the pair of side wall portions 14c.

Figure 9:
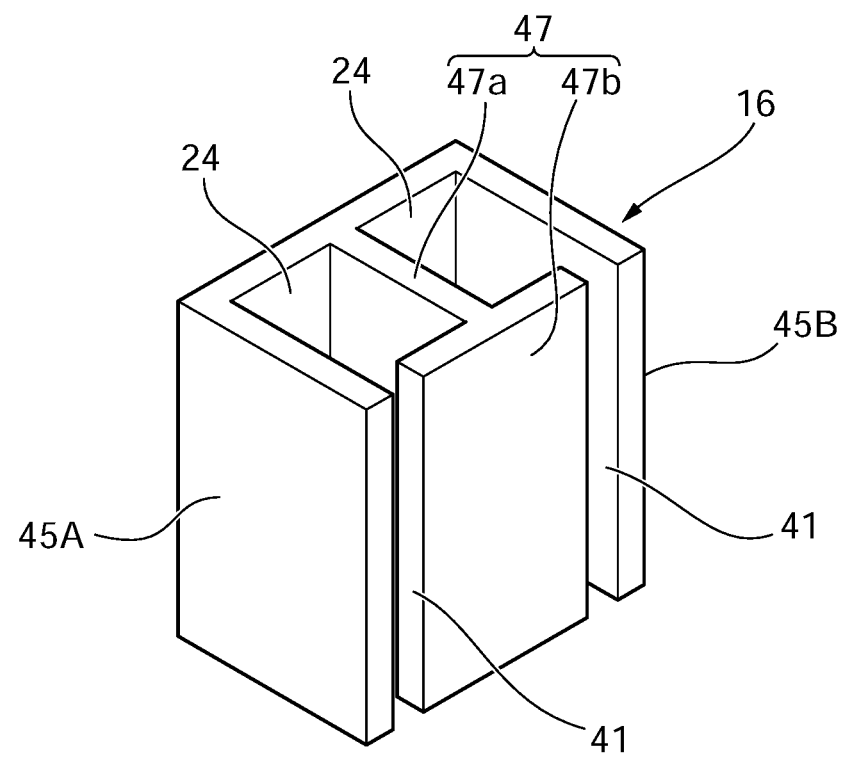
FIG. 9 is a perspective view of the bonding assistance member.

FIG. 9 is a perspective view of the bonding assistance member 16. The gaps 41 of the bonding assistance member 16 are formed at both ends on one rectangular side of a section orthogonal to the extruding direction. In other words, the configuration of this bonding assistance member 16 can be said to have a pair of outside projecting pieces (projecting pieces) 45A, 45B projecting from the first frame member 19A side toward the cross member 14 side, and a central projecting piece 47 provided between the pair of outside projecting pieces 45A, 45B. The central projecting piece 47 has a pillar portion 47a parallel to the outside projecting pieces 45A, 45B, and a side projecting piece (projecting piece) 47b respectively extending from a projecting leading end of the pillar portion 47a toward the pair of outside projecting pieces 45A, 45B. In the cross member 14, the slit holes 43 which are long holes along the respective projecting pieces are formed at positions where the pair of outside projecting pieces 45A, 45B and the side projecting piece 47b face each other.

Figure 10:
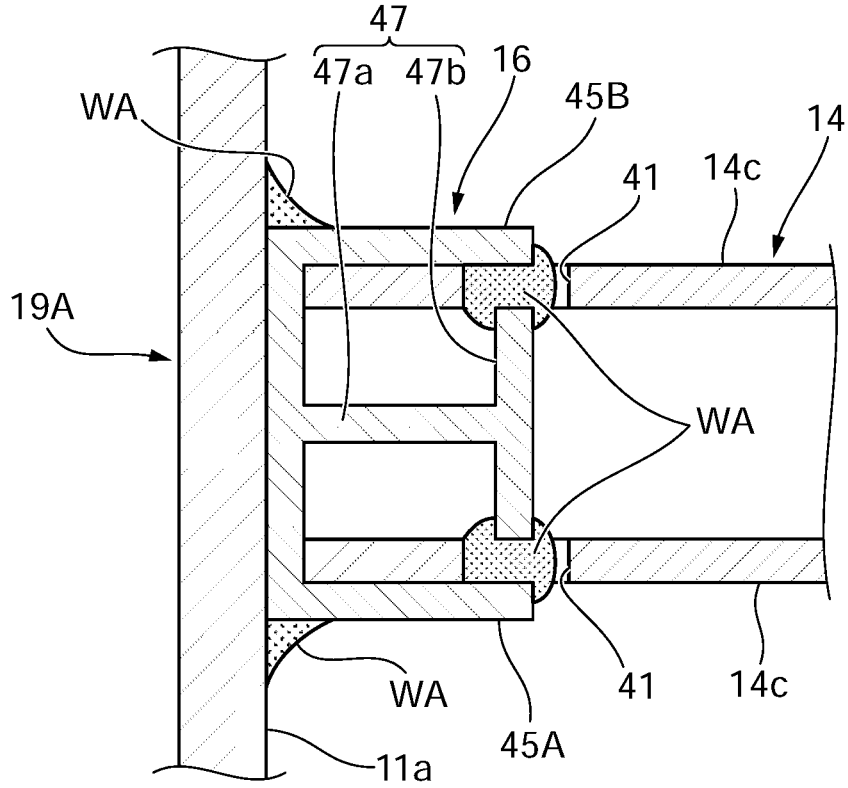
FIG. 10 is a sectional view taken along the line X-X shown in FIG. 8.

FIG. 10 is a sectional view taken along the line X-X shown in FIG. 8. The side wall portions 14c of the cross member 14 are inserted into the gaps 41 of the bonding assistance member 16. Projecting leading end portions of the outside projecting pieces 45A, 45B face leading end portions of the side projecting piece 47b of the bonding assistance member 16 through the slit holes 43 formed in the side wall portions 14c of the cross member 14. Portions between the outside projecting pieces 45A, 45B and the side projecting piece 47b are line-welded by the aluminum MIG welding. Thereby, aluminum weld metals WA that bond the pair of outside projecting pieces 45A, 45B and the side projecting piece 47b are formed along the slit holes 43. Therefore, the cross member 14 is bonded to the bonding assistance member 16 via the slit holes 43. Moreover, the bonding assistance member 16 is bonded to the first frame member 19A with the aluminum weld metals WA. As described above, the bonding assistance member 16 bonds the first frame member 19A and the cross member 14.

Moreover, as shown in FIG. 8, at positions of a plurality of through holes 37 formed in flange portions 14d of the cross member 14, the cross member 14 and the floor plate member 17 are bonded by the different-material MIG spot welding.

With the present configuration, since the aluminum weld metal WA by line welding and the aluminum weld metal WA by spot welding can be formed by the same type of welding method, the manufacturing step does not become complicated, and it is possible to arrange equipment, etc. while saving space. Therefore, it is possible to suppress an increase in equipment cost and a loss of takt time, and production can be made efficiently.

Moreover, the cross member 14 and the first frame member 19A are bonded by line welding via the bonding assistance member 16. Thus, it is possible to bond the cross member 14 and the first frame member 19A with high strength.

It should be noted that the shape of the bonding assistance member 16 shown herein is just an example but not limited to this. Although not shown, for example, a mode in which as a thick slit as the cross member 14 is formed in the bonding assistance member 16 of an aluminum material and bonding is made by pushing and fitting the cross member 14 into the slit may be available. That is, a fixing mode in which a steel material is fitted into an aluminum material may be available.

Moreover, although any of the aluminum weld metal WA by line welding described above is formed in part of the corner portion, the aluminum weld metal WA may be formed over the entire length of the corner portion without any clearance. In that case, it is preferable since the battery case has a liquid-tight structure and a sealing property inside and outside the case becomes favorable.

In such a way, the present invention is not limited to the embodiments described above, but a combination of the respective configurations of the embodiments, and a change and an application made by those skilled in the art based on the description of the specification and the known techniques are also anticipated by the present invention and included in a range for which protection is sought.

For example, although the example in which work is made by the aluminum MIG welding is shown in the above description, a welding method using another heat source such as laser welding or laser-arc hybrid welding may be used. Laser welding has characteristics of low-heat input, high precision, high-speed welding, and furthermore excellence in deep penetration welding. Moreover, with laser-arc hybrid welding, it is possible to expect more efficient and higher-quality welding. Then, as a filler metal, in addition to use of an aluminum filler metal, aluminum powder, etc. can also be used. It is possible to use aluminum powder which is widely adopted in, for example, a deposition method, a powder bed method, etc. by a metal 3D printer. That is, welding of an aluminum material in the present invention may be welding using an aluminum filler metal.

As described above, the following items are disclosed in the present specification.

(1) A battery case in which at least one cross member is provided between a pair of opposing wall surfaces of an inner peripheral surface of a rectangular frame body to partition an inside space surrounded by the frame body, wherein a bonding assistance member is provided between each of end portions of the cross member and each of the wall surfaces of the frame body facing the end portion, the frame body and the bonding assistance member are made of aluminum or an aluminum alloy, the cross member is made of steel, one end portion of the bonding assistance member is welded to the wall surface, and the bonding assistance member has an overlap portion extending from the one end portion toward the inside space and overlapping with a side surface of the end portion of the cross member, in the cross member, first through holes passing through to look out on the overlap portion of the bonding assistance member are formed, and the bonding assistance member and the cross member are bonded with a weld metal of aluminum or an aluminum alloy formed by welding at positions of the first through holes.

According to this battery case, at the time of bonding the cross member made of steel to the frame body made of aluminum or an aluminum alloy, the bonding assistance member made of aluminum or an aluminum alloy is welded to the frame body, and the cross member is welded to the side surface of this bonding assistance member. Thereby, when an external force is applied to the battery case, a load acts on the portion welded to the cross member not in the break-away direction but in the shearing direction, and the bonding strength is improved. Moreover, since only welding of the aluminum materials to each other is required, the manufacturing step does not become complicated.

(2) The battery case according to (1), wherein the first through holes are formed to spread among a plurality of points in a region overlapping with the overlap portion of the bonding assistance member.

According to this battery case, the bonding assistance member and the cross member are welded at the positions of the first through holes provided at the plurality of points, and it is possible to improve the bonding strength between the bonding assistance member and the cross member.

(3) The battery case according to (1), wherein the bonding assistance member has at least a pair of projecting pieces arranged to nip the side surface of the end portion of the cross member, the first through holes are formed at positions where leading ends of the projecting pieces face each other in the cross member, and the bonding assistance member and the cross member are bonded by welding of the leading ends of the projecting pieces to each other formed through the first through holes of the cross member.

According to this battery case, by welding the leading ends of the projecting pieces to each other through the first through holes, the bonding assistance member and the cross member are bonded.

(4) The battery case according to (3), wherein the first through holes are long holes along the leading ends of the projecting pieces.

According to this battery case, by line-welding along the first through holes which are long holes, it is possible to improve the bonding strength.

(5) The battery case according to any one of (1) to (4), wherein the frame body is formed by an extruded material.

According to this battery case, by using a low-cost and high-strength extruded material, it is possible to easily enhance the rigidity.

(6) The battery case according to (5), wherein the bonding assistance member is formed by an extruded material.

According to this battery case, it is possible to readily obtain the high-strength bonding assistance member at low cost.

(7) The battery case according to (6), wherein the bonding assistance member is formed by the same extruded material as the frame body.

According to this battery case, it is possible to make use of the same extruded material as the frame body, and further reduce the manufacturing cost.

(8) The battery case according to any one of (1) to (7), including a floor plate member made of aluminum or an aluminum alloy, the floor plate member being bonded to a lower surface of the frame body and serving as a floor surface inside the frame body.

According to this battery case, by including the floor plate member made of aluminum or an aluminum alloy, it is possible to make a high-strength configuration while reducing weight.

(9) The battery case according to (8), wherein the cross member has a flange portion extending along the floor plate member, a plurality of second through holes passing through to look out on the floor plate member are formed in the flange portion, and the cross member and the floor plate member are bonded with a weld metal of aluminum or an aluminum alloy formed by welding at positions of the second through holes.

According to this battery case, it is possible to bond different materials of the cross member and the floor plate member to each other with high strength.

(10) A manufacturing method of a battery case, in which at least one cross member is provided between a pair of opposing wall surfaces of an inner peripheral surface of a rectangular frame body to partition an inside space surrounded by the frame body, a bonding assistance member is provided between each of end portions of the cross member and each of the wall surfaces of the frame body facing the end portion, the frame body and the bonding assistance member are made of aluminum or an aluminum alloy, and the cross member is made of steel, the manufacturing method including:

a step of welding one end portion of the bonding assistance member to the wall surface of the frame body, and a step of, in an overlap portion extending from the one end portion of the bonding assistance member toward the inside space and overlapping with a side surface of the end portion of the cross member, welding at positions of first through holes formed in the cross member, the first through holes passing through to look out on the overlap portion, and bonding the bonding assistance member and the cross member with a weld metal of aluminum or an aluminum alloy formed at the positions of the first through holes.

According to this manufacturing method of the battery case, at the time of bonding the cross member made of steel to the frame body made of aluminum or an aluminum alloy, the bonding assistance member made of aluminum or an aluminum alloy is welded to the frame body, and the cross member is welded to the side surface of this bonding assistance member. Thereby, when an external force is applied to the battery case, a load acts on the portion welded to the cross member not in the break-away direction but in the shearing direction, and the bonding strength is improved. Moreover, since only welding of the aluminum materials to each other is required, the manufacturing step does not become complicated.

(11) The manufacturing method of the battery case according to (10),
   wherein the first through holes are formed to spread among a plurality of points in a region overlapping with the overlap portion of the bonding assistance member, and
   welding of the bonding assistance member and the cross member at the positions of the first through holes is welding using an aluminum filler metal.

According to this manufacturing method of the battery case, it is possible to bond the bonding assistance member and the cross member with high quality by welding using the aluminum filler metal.

(12) The manufacturing method of the battery case according to (10),
   wherein the bonding assistance member has at least a pair of projecting pieces arranged to nip the side surface of the end portion of the cross member,
   the first through holes are formed at positions where leading ends of the projecting pieces face each other in the cross member, and
   welding at the positions of the first through holes is welding performed by letting the leading ends of the projecting pieces through the first through holes and using an aluminum filler metal.

According to this manufacturing method of the battery case, it is possible to bond the bonding assistance member and the cross member with high quality by welding using the aluminum filler metal.

What is claimed is:

1. A battery case, comprising:
   a cross member between a pair of opposing wall surfaces of an inner peripheral surface of a rectangular frame body to partition an inside space surrounded by a frame body; and
   a bonding assistance member between each end portion of the cross member and each of the wall surfaces of the frame body facing the end portion,
   wherein the frame body and the bonding assistance member are made of aluminum or an aluminum alloy,
   wherein the cross member is made of steel,
   wherein one end portion of the bonding assistance member is welded to the wall surface, and the bonding assistance member has an overlap portion extending from the one end portion toward the inside space and overlapping with a side surface of the end portion of the cross member,
   wherein in the cross member, first through holes passing through to look out on the overlap portion of the bonding assistance member are formed, and
   wherein the bonding assistance member and the cross member are bonded with a weld metal of aluminum or an aluminum alloy formed by welding at positions of the first through holes.

2. The battery case according to claim 1, wherein the first through holes are formed to spread among a plurality of points in a region overlapping with the overlap portion of the bonding assistance member.

3. The battery case according to claim 1,
   wherein the bonding assistance member has at least a pair of projecting pieces arranged to nip the side surface of the end portion of the cross member,
   wherein the first through holes are formed at positions where leading ends of the projecting pieces face each other in the cross member, and
   wherein the bonding assistance member and the cross member are bonded by welding of the leading ends of the projecting pieces to each other formed through the first through holes of the cross member.

4. The battery case according to claim 3, wherein the first through holes are long holes along the leading ends of the projecting pieces.

5. The battery case according to claim 1, wherein the frame body is formed by an extruded material.

6. The battery case according to claim 5, wherein the bonding assistance member is formed by an extruded material.

7. The battery case according to claim 6, wherein the bonding assistance member is formed by the same extruded material as the frame body.

8. The battery case according to claim 1, further comprising:
   a floor plate member made of aluminum or an aluminum alloy, the floor plate member being bonded to a lower surface of the frame body and serving as a floor surface inside the frame body.

9. The battery case according to claim 8,
   wherein the cross member has a flange portion extending along the floor plate member,
   wherein a plurality of second through holes passing through to look out on the floor plate member are formed in the flange portion, and
   wherein the cross member and the floor plate member are bonded with a weld metal of aluminum or an aluminum alloy formed by welding at positions of the second through holes.

10. A manufacturing method of a battery case, wherein the battery case comprises:
   a cross member between a pair of opposing wall surfaces of an inner peripheral surface of a rectangular frame body to partition an inside space surrounded by the frame body, and
   a bonding assistance member between each end portion of the cross member and each of the wall surfaces of the frame body facing the end portion,
   wherein the frame body and the bonding assistance member are made of aluminum or an aluminum alloy, and
   wherein the cross member is made of steel,

wherein the manufacturing method comprises:

welding one end portion of the bonding assistance member to the wall surface of the frame body;

welding at positions of first through holes formed in the cross member in an overlap portion extending from the one end portion of the bonding assistance member toward the inside space and overlapping with a side surface of the end portion of the cross member, wherein the first through holes passing through to look out on the overlap portion; and bonding the bonding assistance member and the cross member with a weld metal of aluminum or an aluminum alloy formed at the positions of the first through holes.

11. The manufacturing method of the battery case according to claim 10, wherein the first through holes are formed to spread among a plurality of points in a region overlapping with the overlap portion of the bonding assistance member, and wherein the welding of the bonding assistance member and the cross member at the positions of the first through holes is with an aluminum filler metal.

12. The manufacturing method of the battery case according to claim 10, wherein the bonding assistance member has at least a pair of projecting pieces arranged to nip the side surface of the end portion of the cross member, wherein the first through holes are formed at positions where leading ends of the projecting pieces face each other in the cross member, and wherein the welding at the positions of the first through holes is performed by letting the leading ends of the projecting pieces through the first through holes and with an aluminum filler metal.

* * * * *